United States Patent [19]

Bennett et al.

[11] Patent Number: 5,022,739
[45] Date of Patent: Jun. 11, 1991

[54] DIRECTION INDICATING REFLECTOR WITH PLANAR REFLECTOR PANELS INCLUDING CUBE CORNERS

[76] Inventors: Reginald B. Bennett, 3103 Seneca Dr., Oakville, Ontario, Canada, L4L 1B1; Reginald S. Bennett, 44 Charles Street West, Suite 4408, P.O. Box 247, Station 'F', Toronto, Ontario, Canada, M4Y 2L5

[21] Appl. No.: 538,012
[22] Filed: Jun. 13, 1990
[51] Int. Cl.⁵ .............................................. G02B 5/122
[52] U.S. Cl. .................................. 350/102; 350/109; 350/97; 356/138
[58] Field of Search ................ 350/102, 103, 109, 97, 350/616; 356/138, 399

[56] References Cited

U.S. PATENT DOCUMENTS

| | | | |
|---|---|---|---|
| 3,358,944 | 12/1967 | Ule | 356/138 |
| 3,458,245 | 7/1969 | Stanley | 350/102 |
| 3,572,942 | 3/1971 | teKronnie | 356/138 |
| 3,784,279 | 1/1974 | Hedgewick | 350/109 |
| 3,873,210 | 3/1975 | Konopka | 356/138 |
| 3,984,175 | 10/1976 | Suhr et al. | 350/109 |
| 4,560,236 | 12/1985 | Clarke | 350/102 |
| 4,629,325 | 12/1986 | Bergkuist et al. | 356/399 |

FOREIGN PATENT DOCUMENTS 2642958 3/1978 Fed. Rep. of Germany ........ 350/97

Primary Examiner—Jon W. Henry

[57] ABSTRACT

A direction indicating reflector uses two planar reflecting panels arranged at an included angle of about 60° to each other. Each panel provides an optically exposed plurality of cube corners arranged in triads of mutually perpendicular retro reflectant surfaces which are not individually distinguishable at minimum expected viewing distances.

8 Claims, 5 Drawing Sheets

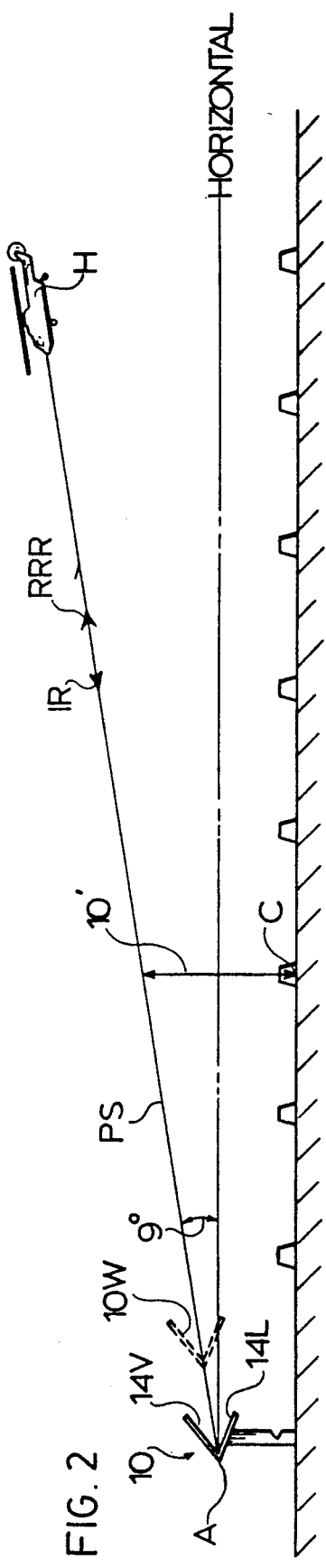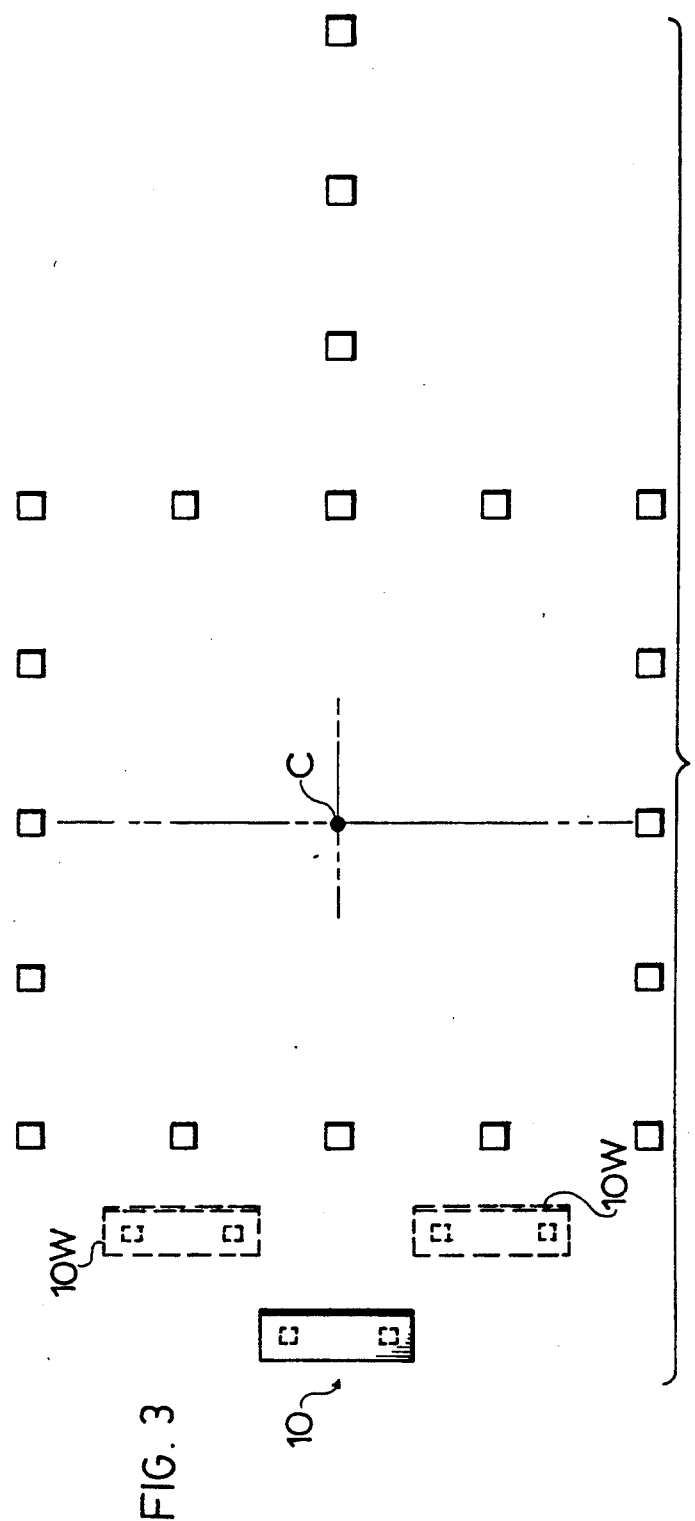
FIG. 2
FIG. 3

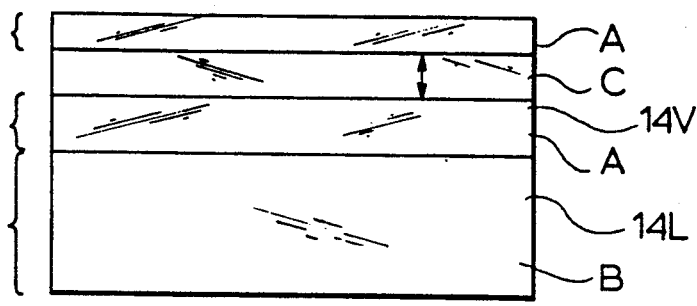
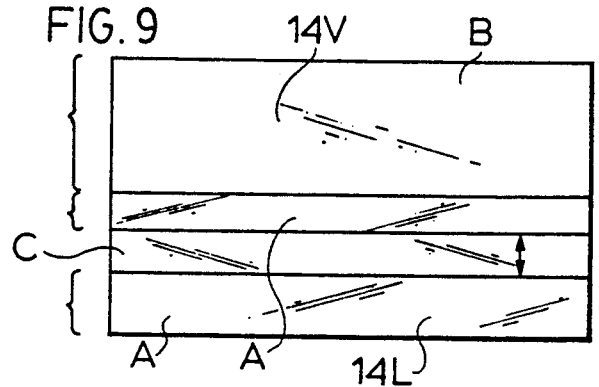
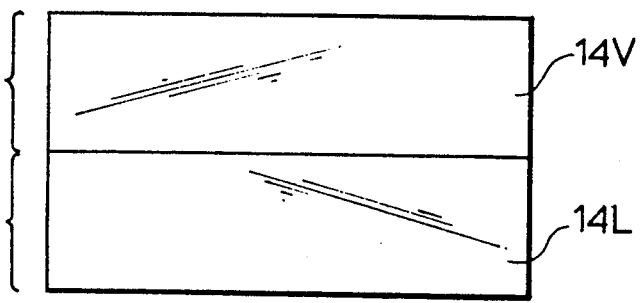
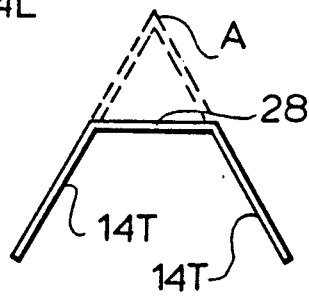
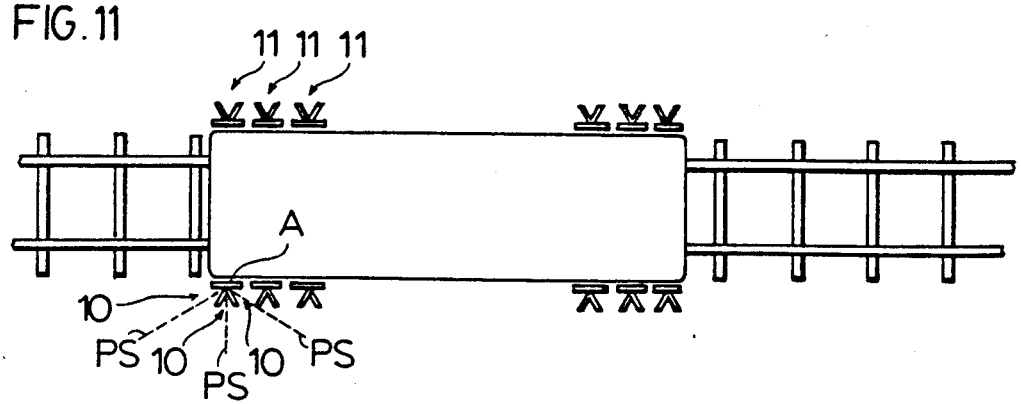

DIRECTION INDICATING REFLECTOR WITH PLANAR REFLECTOR PANELS INCLUDING CUBE CORNERS

This invention relates to a direction indicating optical reflector of a type indicating whether the viewer of the reflector is to one side, to the other or on a plane defined by the reflector. Such reflectors will have many uses among which are defining the approach angle for a fixed wing aircraft or helicopter (with the plane directed along the approved path) or defining an azimuthal approach path for an aircraft or vehicle—where the plane is vertical and directed in the desired azimuthal direction. (By 'aircraft' herein I include helicopters and fixed wing aircraft.)

The invention in another aspect also relates to an optical reflector designed to provide a moving reflection pattern responsive to relative movement between the reflecting body and a light source.

The invention uses a pair of reflectant planar panels with the reflector panels defining an included angle of approximately 60° to each other and defining a 'plane of symmetry' being a plane with a common axis to the other two and bisecting the angle between them. It will be seen from the description to follow that the direction indicating a desired path (along the plane of symmetry) is indicated by the two panels.

The planar reflectant panels are each made up of exposed pluralities of cube corner retro reflectant 'CCRR' surfaces composed of a multiplicity of triads of mutually perpendicular reflectant surfaces which are approximately symmetrical about a normal to the plane of the panel and of a size to be individually indistinguishable at minimum viewing distance.

Planar surfaces using CCRR surfaces have been well known, as described in detail hereafter, for their quality of reflecting incident rays in the opposite to the incidence direction over a relatively wide cone about the normal to the surface.

However this invention takes advantage of a newly discovered characteristic of such CCRR surfaces. I have found that when two planes composed of such surfaces are arranged to define an included angle of 60° when a light is projected approximately along the plane of symmetry to the line of intersection of the planes, then a viewer looking approximately along the line of incidence of the light sees reflecting areas of approximately equal brightness from the two panels. On the other hand if the light from the viewer is projected from a location on one side or the other of such plane then the corresponding areas on the panels are dark and light with the position of the dark side indicating the direction in which the viewer must change position, in order to be located on the symmetry plane. Thus the reflector may be used to define an approach plane directed at a shallow angle for an aircraft or to define a vertical plane indicating an azimuthal approach angle to a vehicle or aircraft. The phenomona may be used for viewers whose viewing angle is along a line not more than about 3° to the plane of symmetry.

A second optical phenomenon occurs in the reflector of the invention. As noted, to an observer of retro reflected light directed approximately parallel to the plane of symmetry and on one side thereof, the planar reflector on that side gives a brighter reflection than the planar reflector on the other side. In addition, to the viewer looking at the retro reflection, a bright band appears, roughly parallel to the line of intersection, of the planes, on the brighter reflecting plane, that is the reflecting plane on the same side of the plane of symmetry as the viewer. Moreover for small changes of the position of the observer relative to the plane of symmetry a large change takes place in the position of the band. In some applications of the invention this is used to alert a viewer to the presence of the device and the object on which it is mounted. For example a reflector in accord with the invention mounted on the side of a freight car, and directed with the reflector's plane of symmetry vertical and perpendicular to such side, supplies through its bright band, a moving and noticeable signal to car headlights at a crossing.

The reason for the band is unknown to us but in texture it resembles a moiré (or diffraction) fringe band, although brighter where the moireé fringe is darker. It may be a diffraction pattern created in the retro reflected rays reflected from a band of the brighter plane member.

Retro reflective properties of CCRR reflectors are known and have been used in several kinds of applications as discussed in U.S. Pat. No. 3,712,706 which issued on Jan. 23, 1973 to American Cyanamid Company and in U.S. Pat. No. 4,202,600 which issued on May 13, 1980 to Avery International Corporation. The contents of these patents are incorporated herein by reference.

As explained in U.S. Pat. No. 4,202,600 a CCRR having a regular planar array of triangular based cube corner prisms (with the axis of symmetry of each triad perpendicular to the plane of the array) has a varying direction reflection property measured in azimuth about a normal to the plane for rays impinging at greater than 30° to the normal to the plane (that is a greater than 30° angle of incidence). Since the angles of incidence encountered with use of the invention are in the vicinity of 60° this directional property of such becomes a disadvantage.

Moreover, as explained in the patent the cells in the array and the array orientation as also desired for use with this invention are indistinguishable to the unaided eye so that the orientation of such array is frequently unknown to the constructor of the reflectors.

It is preferred, with this invention, to provide the two planar reflectors facing across a 60° included angle, each planar reflector provided with corner cube reflectors wherein the reflecting area is, in accord with the teaching of U.S. Pat. No. 4,202,600, made up of a plurality of zones, in each zone having an ordered array of CC reflectors, but differing azimuthal orientation. Preferably adjacent zones vary by 30° of azimuthal orientation to provide the relatively uniform results in azimuthal directions. The zones are themselves too small to be distinguished by the unaided eye at minimum expected viewing distances, and thus the plural zone reflectors produce relatively even reflection in all azimuthal directions at high angles of incidence.

The invention provides a pair of planar CCRR's where the individual corner cube triads are indistinguishable to the eye at minimum viewing distances oriented so that their planes meet at an approximate 60° angle and define guiding direction in a plane 'plane of symmetry' bisecting the angle between the two planar reflectors.

Preferably the cube corner triads are arranged in regular arrays in zones but adjacent zones have arrays of different orientation preferably differing by 30° and with the zones small enough to be indistinguishable to the unaided eye at minimum viewing distances.

It should be noted, that in most applications of the invention, the planar reflectors whose planes intersect at approximately 60° physically meet at the line of intersection. However it is within the scope of the invention to provide that the two 60° planar members stop short of their planar intersection and are joined by a reflecting plane, also covered with CCRR material, perpendicular to the plane of symmetry. In such an application the joining plane provides a conventional retro reflecting panel between the optical effects produced by the two 60° separated planar reflectors.

Preferably, as taught in the U.S. Pat. No. 4,202,600 the planar reflectors are made by applying a carrier sheet with the cube corner retroreflecting material to a supporting member which may be made of wood, metal, plastic (preferably ultra violet stabilized) or any suitable material.

Preferably the retro reflecting sheet is that sold under the trade mark REFLEXITE manufactured by Reflexite Corporation, P.O. Box 1200, 315 South St., New Britain, Conn. 06050, and sold under the number AP 1000.

In drawings which illustrate a preferred embodiment of the invention:

Figure 1:
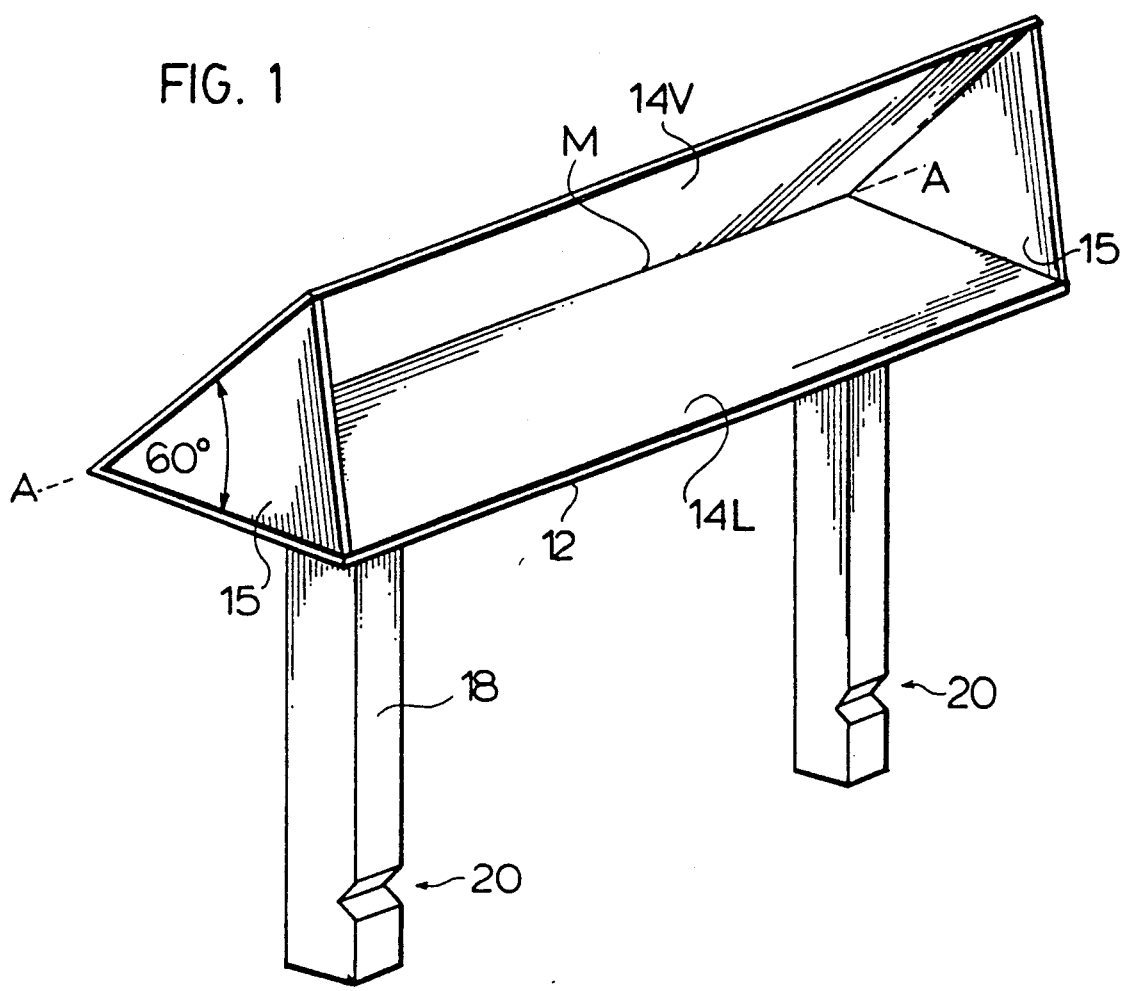
FIG. 1 is perspective view of a reflector in accord with the invention.
Figure 4:
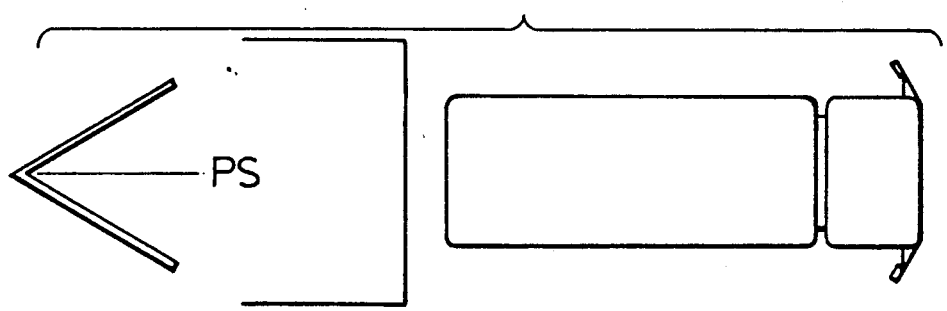
Figure 5:
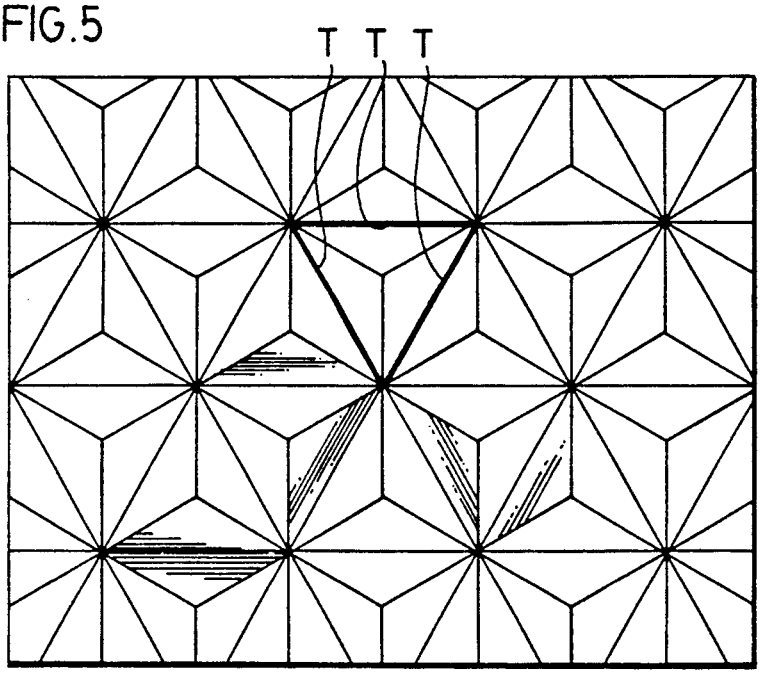
Figure 6:
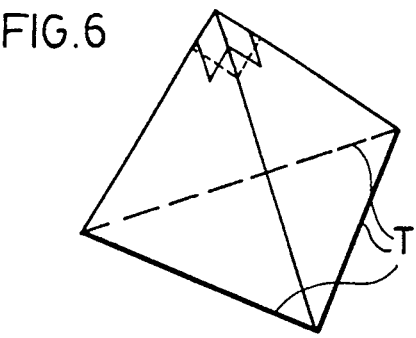
Figure 7:
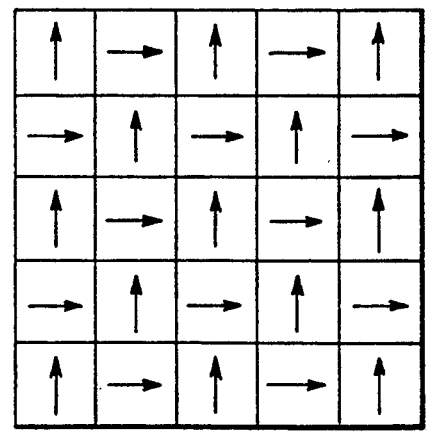
Figure 1A:
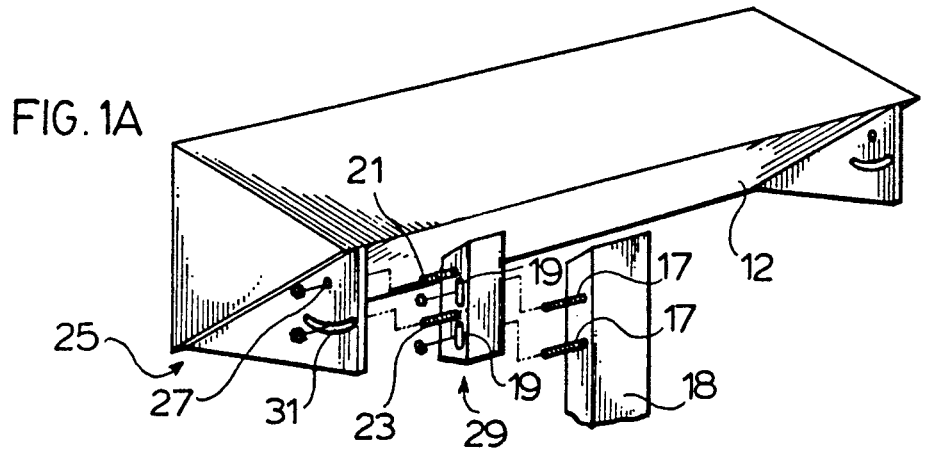
FIG. 1A shows a construction detail of the device of FIG. 1.

FIG. 2 in side view shows the invention used to assist in the landing of a helicopter;

FIG. 3 is a plan view of the arrangement of FIG. 2;

FIG. 4 is a plan view of the device used for truck parking;

FIG. 5 is a schematic view of an ordered array of cube centred reflectors;

FIG. 6 is a perspective of a triad of cube faces;

FIG. 7 is a schematic view showing an array of zones;

FIG. 8 indicates the appearance of the planar reflector of FIG. 1 retro reflected rays to an observer above the plane of symmetry;

FIG. 9 indicates the appearance of the planar reflector of FIG. 1 for retro reflected rays to an observer below the plane of symmetry;

FIG. 10 indicates the appearance of the planar reflector of FIG. 1 for retroreflected rays to an observer on the plane of symmetry;

FIG. 11 shows 3 reflectors, in accord with the invention with their apices together and symmetry planes at 60° to the adjacent one;

FIG. 12 shows an alternate form of the invention.

Figure 13:
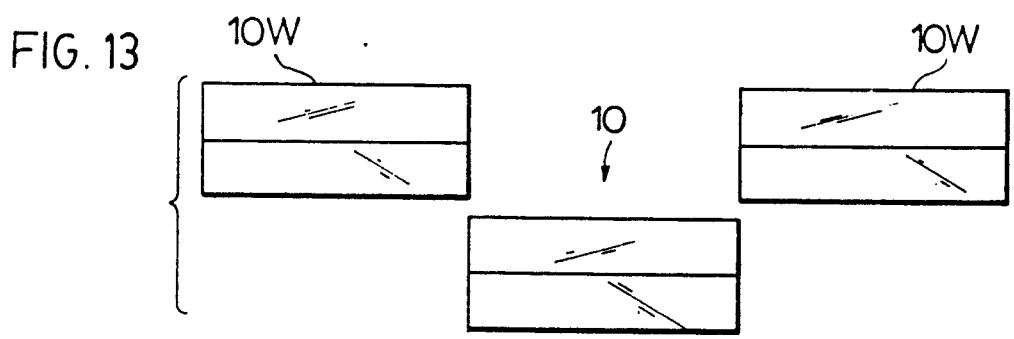
Figure 14:
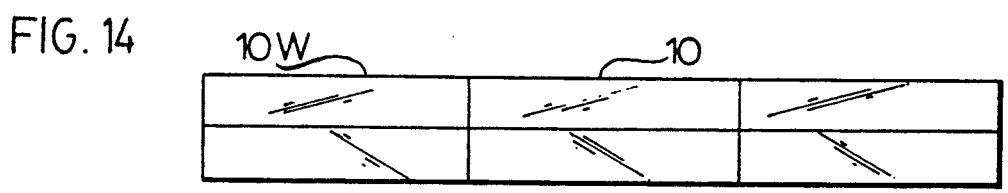
Figure 15:
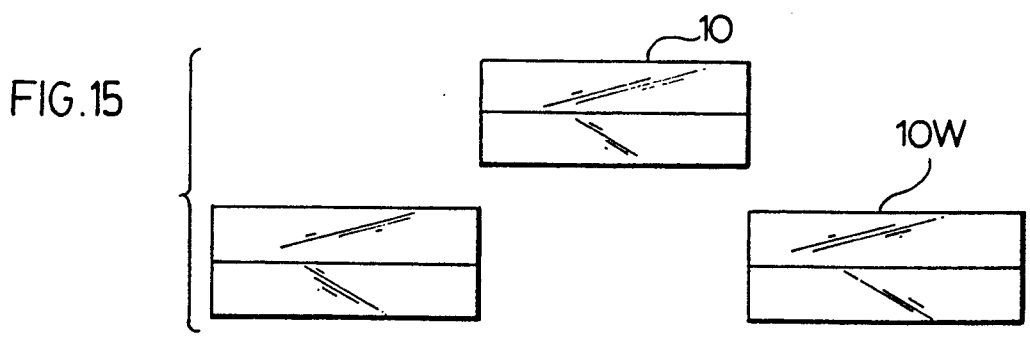

FIG. 13, 14 and 15 demonstrate a preferred application of the invention.

In the drawings FIG. 1 shows the inventive reflector comprising two flat sheets 12 preferably of molded plastic or metal connected and braced by end plates 15 or by any other desired means to define planes meeting at axis A with an included angle of 60°.

On each of the sheet 12 sides facing the included angle is mounted the Reflexite (TM) AP 1000 CCRR material 14V and 14L previously referred to, which has a self-adhesive backing.

The sheets 14V and 14L of reflecting material generally define the two planar reflectors it being noted that such mounted sheets 14 will not be optically smooth. Customarily the AP 1000 material comes with its own reflective backing.

The reflector 10 defines a 'plane of symmetry' PS passing through the line of intersection between the generally planar sheets 14 and bisecting the angle between them.

The reflector 10 is shown in FIG. 1 mounted for guiding a helicopter landing over a descent angle of 9°. Thus it is shown mounted on two 2×4 wooden standards 18 embedded in any conventional manner in the ground. In accord with requirements for aircraft landing guides such bases must be 'frangible'. Thus the standards are 'nicked' at 20 so that, if struck by an aircraft, the upper portion will break off minimizing the risk of injury. If desired frangible metal supports may be used.

FIG. 1 A shows levelling means for the reflector 10 or the lower side of lower sheet side 12. The top of each standard 18 has two projecting threaded studs 17. These go through vertical slots 19 on mounting plate 29 and have nuts which may be tightened to clamp plate 29 at the desired height adjustment. The two plates 21 may thus have different slot adjustments to achieve level height. Plate 29 has threaded studs 21 and 23. A levelling bracket 25 is attached to the lower side of reflector 10 with a hole 27 to receive stud 21 and an arcuate slot 31 to receive stud 23. Thus the reflector can be adjusted to the right angle and the bolts tightened. In adjustment therefore the height of studs 17 in slots 19 is first adjusted at each end of the device and the nuts tightened on studs 19 to produce a level axis A. The bracket 25 is then rotated about stud 21 to achieve the desired angle of plane PS and the nuts tightened on studs 21 and 23. If frangible metal supports are used these should also provide for level adjustment.

In addition to its use in remote locations where no lighting is available, the reflector of the invention may be used at urban airports in a heavy use zone. In the latter application, instead of the 'nicked' wooden standards shown in FIG. 1 it is preferred to use frangible metal standards.

As shown the device is mounted to define (by the plane of symmetry PS (FIGS. 2 and 4) (normal to the plane of FIGS. 2 or 4). In FIG. 2 the plane of symmetry defines a descent path of 9° for helicopters, and located to bring the helicopter over the centre C of the landing square at a selected height (for example) of 10'. (At such point the helicopter pilot ceases use of the retro reflecting device and lands by sight.)

In FIG. 2 the line PS indicates the plane of symmetry perpendicular to the plane of the paper and also the path of incident rays IR from a forwardly directed light on helicopter H and also the path of the retro reflected rays RRR from reflector 10.

FIG. 8 shows a view of the device from a helicopter equipped with a forwardly directed light and located just upward of the plane of symmetry PS with the bright upper and faint lower reflectors 14V and 14L, respectively indicating that the helicopter pilot is above the desired flight path. In FIG. 9 the view a is from just below the plane of symmetry PS with the bright lower and faint upper reflector indicating that the helicopter is below the desired flight path. In FIG. 10 the view is along the plane of symmetry PS (the view of FIG. 2) with the approximately equal reflections from the upper and lower reflectors indicating that the pilot is on the desired flight path.

In FIGS. 8 and 9 the areas A of one panel 14 are brighter than the areas B of the other panel. In addition a band C between areas A is brighter than areas A and will move across the areas A to provide a bright travelling indication to the viewer of retro reflected light of the presence of the device. The bright and dark areas A and B will not be quite uniform across their areas and the band C may not be geometrically straight. This is principally because the planar members 14V and 14L are not optically flat. However in the proposed applications of the invention this does not seriously impair its efficacy and usefulness.

Obviously any desired descent angle may be used and for fixed wing aircraft a descent angle of 3° to 6° will customarily be used.

FIG. 4 shows schematically in plan view the inventive device 10 defining a vertical approach plane of symmetry PS for bringing a transport truck to a loading dock.

The preferred (or another) material may be used in any color desired and available. AP 1000 is customarily supplied in white, yellow, orange, red, green and blue. It is within the scope of the invention to use differing colors for the two panels 14 in specific applications. Care must be used to match the reflective indices of different colors to maintain effectiveness of this device, otherwise the observer may have trouble detecting from unequal reflections his location relative to the plane of symmetry.

FIG. 5 shows in plan an arrangement of cube cornered retro reflectant material in an ordered array. The cube corners are formed by a mutually perpendicular faces forming an equilateral triangle, for example the darkly outlined triangle with sides T. It should be realized that the faces may form triad cavities inward relative to the material or triad prisms outward relative to the material.

FIG. 7 demonstrates, by way of example only, a way of providing zones of arrays where the orientation of each array is at 90° to the adjacent array. FIG. 7 is taken from FIG. 6 of U.S. Pat. No. 4,202,600 and demonstrates only one of the ways of providing ordered arrays at the desired angle of 30° to each other. (Because the each ordered array has 3 way symmetry, the 90° rotation of an array zone creates, in effect, a 30° rotation of the array.)

FIG. 12 shows an alternative form of the device where the 60° angle reflectors 14T stop short of the planar line of intersection A and are joined at their inner end by a CCRR reflectant panel 28 perpendicular to the plane of symmetry. Thus the inventive optical effect is produced by the joint effect of the planes 14T; while the middle plane performs an ordinary reflectant function.

FIG. 11 shows banks of assemblies 11 attached to the side of a freight car. Each assembly 11 comprises three reflectors 10 assembled with their three planes of symmetry PS intersecting with common axes A and so that each plane of symmetry is at 60° to the next. Such assemblies 11 are preferably mounted in banks of three on the front and back of a freight car and on each side thereof. Such arrangement on the side of freight cars provides, at night, a very good warning to cars since the lights of the cars are retro reflected by one or more of the reflectors 10 (or by one of the reflector 10 planes); drawing the attention of the drivers to the train when the bands C, visible to the driver, move across one or more of the reflector 10 surfaces as the train or the car moves relative to the other.

The assemblies 11 may be employed in many other applications to provide the retro reflected rays and moving bands to warn one of two relatively moving objects of the presence of the other.

The angle between the two panels 14 of a device 10 may vary between about 57° and 63° with the smaller angle giving a sharper transition at the plane of symmetry and a narrower zone where the illumination is equal.

The effects of brighter and fainter panels to guide a viewer toward the plane of symmetry are noted if the observer of the retro reflected light is within about 3° of the plane of symmetry, the 3° being measured between the plane PS and the line from the observer to the line A of intersection of the planes of panels 14 and perpendicular thereto.

The device 10 may be thought of as defining a median plane (the plane of the paper of FIGS. 2 and 4) perpendicular to the plane of symmetry PS. The limits of the angle of viewing to the median plane for an observer of retro reflectant light who is within 3° of the plane of symmetry are not known. This angle which may be considered as the angle to the plane of the paper in FIGS. 2 and 4 of a line from an observer to median point M, half-way across the reflector may be as high as 30°.

The zones of AP 1000 and the array orientation in the zones are not distinguishable to the unaided eye at a distance of a foot. Thus they will not be distinguishable at the 10 foot or higher expected viewing distance for presently contemplated uses of the invention.

A preferred use of the invention is shown in FIGS. 1, 2, 13, 14 and 15.

As demonstrated in FIGS. 1 and 2 the central reflector 10 may be provided with reflectors 10W on each side (shown dotted in FIGS. 1 and 2) of reflector 10, and forward thereof, and having planes of symmetry PS coincident with the plane PS associated with reflector 10 to define the descent path. Thus the reflectors 10W are located to appear to a viewer along the incident and reflected ray direction IR and RRR to be extensions of the reflector 10, (to form with it a continuous bar) as shown in FIG. 14. If the observer is below or above the desired flight path the outer reflectors 10W will appear to be higher (FIG. 13) or lower (FIG. 15), respectively than central reflector 10. Thus the pilot need only steer toward the relative height of the outer reflector 10W to regain the desired flight path. The effect is enhanced by the differential appearance of the two panels 14V and 14L of each reflector 10 or 10W as previously described.

I CLAIM:
1. Direction indicating reflector comprising a pair of planar reflector panels arranged at an included angle of approximately 60° to each other
   each planar reflector panel provides an optically exposed plurality of cube corners
   arranged in triads of mutual perpendicular retro reflectant surfaces which are not individually distinguishable at minimum expected viewing distances
   wherein said triads of mutually perpendicular surfaces are each approximately symmetrical about a normal to the panel.

2. Direction indicating reflector as claimed in claim 1 where said triads are arranged in a plurality of zones, each zone contains such triads in orderly array and said zones being of a size that are not visually resolvable at a minimum expected viewing distance of 10 feet.

3. Direction indicating reflector as claimed in claim 1 wherein said planar reflector panels are contained in sheeting applied to a backing element.

4. Direction indicating reflector, as claimed in claim 2 wherein orientation of the array of a zone is at 30° to the adjacent zones.

5. Direction indicating reflector, as claimed in claim 3 wherein said planar reflector panels are contained in sheeting applied to a backing element.

6. Direction indicating element as claimed in claim 1 wherein said planar reflector panels stop short of the line of intersection of the planes defined by said planar reflector panels and a planar reflector panel is provided with its plane perpendicular to the plane of symmetry of the other two planar reflector panels.

7. Three direction indicating reflectors as claimed in claim 1 wherein the direction indicating reflectors are arranged with their plans of symmetry intersecting at a common axis and the plane of symmetry of each direction indicating reflector at 60° to that of an adjacent direction indicating reflector.

8. Three direction indicating reflectors as claimed in claim 1, wherein each said indicating reflector defines a plane of symmetry and said indicating reflectors are arranged so that their planes of symmetry substantially coincide and are oriented so that said planes of symmetry extend along a predetermined acute angle to the horizontal, said three indicating reflectors each being oriented perpendicular to a horizontal direction in plan view, two of said reflectors being located on opposite sides of the third and displaced in said direction therefrom.

* * * * *